US012687658B2

(12) United States Patent　　　(10) Patent No.:　US 12,687,658 B2

Tung et al.　　　　　　　　　　　(45) Date of Patent:　　Jul. 21, 2026

---

(54) ANTI-GLARE SUBSTRATE, ANTI-REFLECTION FILM AND DISPLAY DEVICE

(71) Applicant: AUO Corporation, Hsin-Chu (TW)

(72) Inventors: Kuan-Yu Tung, Hsin-Chu (TW); Ken-Yu Liu, Hsin-Chu (TW); Shang Wei Hsieh, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 701 days.

(21) Appl. No.: 17/881,281

(22) Filed: Aug. 4, 2022

(65) Prior Publication Data

US 2023/0071211 A1　　Mar. 9, 2023

(30) Foreign Application Priority Data

Aug. 20, 2021　　(TW) ................................. 110130942

(51) Int. Cl.
G02B 1/11　　　　(2015.01)
(52) U.S. Cl.
CPC ..................................... G02B 1/11 (2013.01)
(58) Field of Classification Search
CPC ....................................................... G02B 1/11
USPC ......................................................... 359/601
See application file for complete search history.

(56) References Cited

FOREIGN PATENT DOCUMENTS

| | | | |
|---|---|---|---|
| CN | 107462942 A | * | 12/2017 |
| TW | 201905499 | | 2/2019 |
| TW | 202020482 | | 6/2020 |
| TW | 202131021 | | 8/2021 |

OTHER PUBLICATIONS

Translation of CN 107462942 (Year: 2025).*
China National Intellectual Property Administration has issued the Office Action for the corresponding CN application on Nov. 2, 2022.

* cited by examiner

*Primary Examiner* — Jerry L Brooks
(74) *Attorney, Agent, or Firm* — WPAT, PC

(57)　　　　　　ABSTRACT

An anti-glare substrate, an anti-reflection film, and a display device are disclosed. The anti-glare substrate includes a first surface and a second surface disposed on opposite sides. The first surface includes a plurality of protrusion structures. Each protrusion structure includes a plurality of inclined planes. There is an angle $\theta$ between the normal direction of each inclined plane and the normal direction of the second surface. The sum of the vertical projection area of the inclined planes with $\theta$ less than 2.5° on the second surface is $A_{<2.5}$, wherein the vertical projection area of the inclined planes is $A_T$, wherein $$\frac{A_{<2.5}}{A_T} \times 100\% \leq 3.58\%.$$

The anti-reflection film is for use with an anti-glare substrate. For a first assembly formed by disposing the anti-reflection film on the anti-glare substrate, the reflectances to blue ray, to green ray, and to red ray are close. The display device includes the anti-glare substrate and a display panel.

13 Claims, 3 Drawing Sheets

800

900

ANTI-GLARE SUBSTRATE, ANTI-REFLECTION FILM AND DISPLAY DEVICE

CROSS-REFERENCE TO RELATED APPLICATION

This application claims the priority benefit of Taiwan application serial no. 110130942 filed on Aug. 20, 2021. The entirety of the above-mentioned patent applications is hereby incorporated by reference herein and made a part of this specification.

BACKGROUND

Technical Field

The present invention relates to an anti-glare substrate, an anti-reflection film, and a display device.

Related Art

Flat and curved display modules have been widely applied to various electronic devices such as mobile phones, wearable devices, televisions, host computers for transportation equipment, personal computers, digital cameras, handheld video games, and the like. However, in order to enhance the visual perception of the user, manufacturers are still continuously improving the optical performance of the display module.

For example, the display surface of some display modules may produce glare due to external ambient light during use. In most use conditions, glare often causes visual discomfort for users and affects the optical performance of the displayed image. In order to solve this problem, some conventional display modules add a high-haze layer with a rough surface on the display surface to reduce glare. However, when glare is reduced by increasing the haziness and roughness of the anti-glare film, there will still be residual reflection of the light source, which will affect the reading experience.

In addition, when display modules are touch-controllable, the aesthetics might be affected by stains such as fingerprints which are easily left on the surface of the conventional anti-glare film during the user's operation.

On the other hand, for a conventional anti-reflection film, the reflectances in the normal direction of a mirror substrate to blue ray (e.g., a light having the wavelength between 400-500 nm), green ray (e.g., a light having the wavelength between 500-600 nm), and red ray (e.g., a light having the wavelength between 600-700 nm) respectively are roughly the same, i.e., there isn't an obvious color shift. However, color shift might occur with the change of the accompanied anti-glare film. Therefore, conventional anti-reflection films are still improvable.

SUMMARY

One of objectives of the present invention is to provide an anti-glare substrate capable of reducing glare.

One of objectives of the present invention is to provide an anti-glare substrate having better anti-stain capability.

One of objectives of the present invention is to provide a display device capable of reducing glare.

One of objectives of the present invention is to provide a display device having better anti-stain capability.

The anti-glare substrate of the present invention includes a first surface and a second surface disposed on opposite sides of the anti-glare substrate. The first surface includes a plurality of protrusion structures. Each protrusion structure includes a plurality of inclined planes. There is an angle $\theta$ between the normal direction of each inclined plane and the normal direction of the second surface. The sum of the vertical projection area of the inclined planes with $\theta$ less than 2.5° on the second surface is $A_{<2.5}$, wherein the vertical projection area of the inclined planes is $A_T$, wherein $$\frac{A_{<2.5}}{A_T} \times 100\% \le 3.58\%.$$

The anti-reflection film of the present invention is for use with an anti-glare substrate. When a first assembly is formed by disposing the anti-reflection film on an anti-glare substrate, the first assembly's reflectance to blue ray, green ray, and red ray respectively are close. When a second assembly is formed by disposing the anti-reflection film on a mirror substrate, the second assembly's reflectance to blue ray is greater than or equal to its reflectance to green ray, which is in turn greater than or equal to its reflectance to red ray.

The display device of the present invention includes an anti-glare substrate and a display panel.

DETAILED DESCRIPTION

Figure 1:
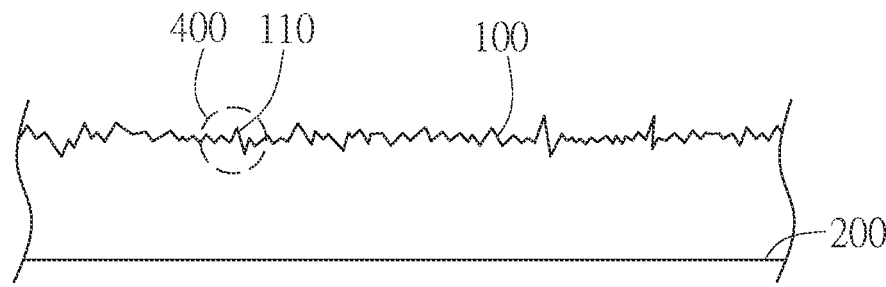
FIG. 1 is a schematic diagram of an embodiment of an anti-glare substrate of the present invention.

Implementations of a connection assembly disclosed by the present invention are described below by using particular and specific embodiments with reference to the drawings, and a person skilled in the art may learn of advantages and effects of the present invention from the disclosure of this specification. However, the following disclosure is not intended to limit the protection scope of the present invention, and a person skilled in the art may carry out the present invention by using other different embodiments based on different viewpoints without departing from the concept and spirit of the present invention. In the accompanying drawings, plate thicknesses of layers, films, panels, regions, and the like are enlarged for clarity. Throughout the specification, same reference numerals indicate same elements. It should be understood that when an element such as a layer, film, region or substrate is referred to as being "on" or "connected" to another element, it may be directly on or connected to the another element, or intervening elements may also be present. In contrast, when an element is referred to as being "directly on" or "directly connected to" another element, there is no intervening element present. As used herein, "connection" may refer to a physical and/or electrical connection. Further, "electrical connecting" or "coupling" may indicate that another element exists between two elements.

It should be noted that the terms "first", "second", "third", and the like that are used in the present disclosure can be used for describing various elements, components, regions, layers and/or portions, but the elements, components, regions, layers and/or portions are not limited by the terms. The terms are merely used to distinguish one element, component, region, layer, or portion from another element, component, region, layer, or portion. Therefore, the "first element", "component", "region", "layer", or "portion" discussed below may be referred to as a second element, component, region, layer, or portion without departing from the teaching of this disclosure.

In addition, relative terms, such as "down" or "bottom" and "up" or "top", are used to describe a relationship between an element and another element, as shown in the figures. It should be understood that the relative terms are intended to include different orientations of a device in addition to orientations shown in the figures. For example, if a device in a figure is turned over, an element that is described to be on a "lower" side of another element is directed to be on an "upper" side another element. Therefore, the exemplary terms "down" may include orientations of "down" and "up" and depends on a particular orientation of an accompanying drawing. Similarly, if a device in a figure is turned over, an element that is described as an element "below" another element or an element "below" is directed to be "above" another element. Therefore, the exemplary terms "below" or "below" may include orientations of up and down.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

As shown in the embodiment in FIG. 1, the anti-glare substrate 800 of the present invention includes a first surface 100 and a second surface 200 disposed on opposite sides of the anti-glare substrate 800. The first surface 100 includes a plurality of protrusion structures 110. From a different point of view, the first surface 100 is formed by a plurality of protrusion structures 110 connected with each other. The protrusion structure 110 can be formed simultaneously when forming the anti-glare substrate 800 by an injection molding process. On the other hand, it can be formed after forming the anti-glare substrate 800, e.g., depositing materials that are the same as the anti-glare substrate 800 by chemical vapor deposition or removing a portion of the anti-glare substrate 800 by etching, machining, sand blasting, etc. More particularly, the first surface 100 is substantially a rough surface, wherein the second surface 200 is substantially a smooth surface.

Figure 2:
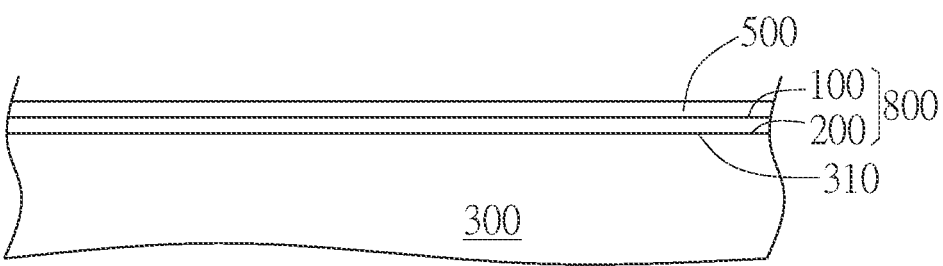
FIG. 2 is a schematic diagram of an embodiment of a display device of the present invention.

As shown in the embodiment in FIG. 2, the anti-glare substrate 800 could be made of glass, optical transparent substrate such as PMMA, resin, etc., which is mixed with organic or inorganic materials. The anti-glare substrate 800 is for an anti-glare film of a display device 900 and is disposed on the display panel 300 by having the second surface 200 laminated on the display face 310. More particularly, the display panel 300 has a display face 310 facing the users. The display face 310 is located in an area where the display panel 300 is capable of displaying images, i.e., an active area (AA) as referred in the art. The anti-glare substrate 800 is disposed on the display face 310 to diffuse ambient light and reduce the amount of specular reflection of the ambient light to improve the visual comfort of users while watching the display panel 300. Regarding the display medium, in one embodiment, the display panel 300 could be liquid crystal displays (LCD). However, in different embodiments, the display panel 300 could be organic light emitting diode (OLED) display, micro-LED display, or other displays with appropriate forms. Regarding flexibility, in one embodiment, the display panel 300 could be rigid panels. However, in different embodiments, the display panel 300 could be flexible panels. In different embodiments, the anti-glare substrate 800 could be used as construction materials or for other use.

Figure 3:
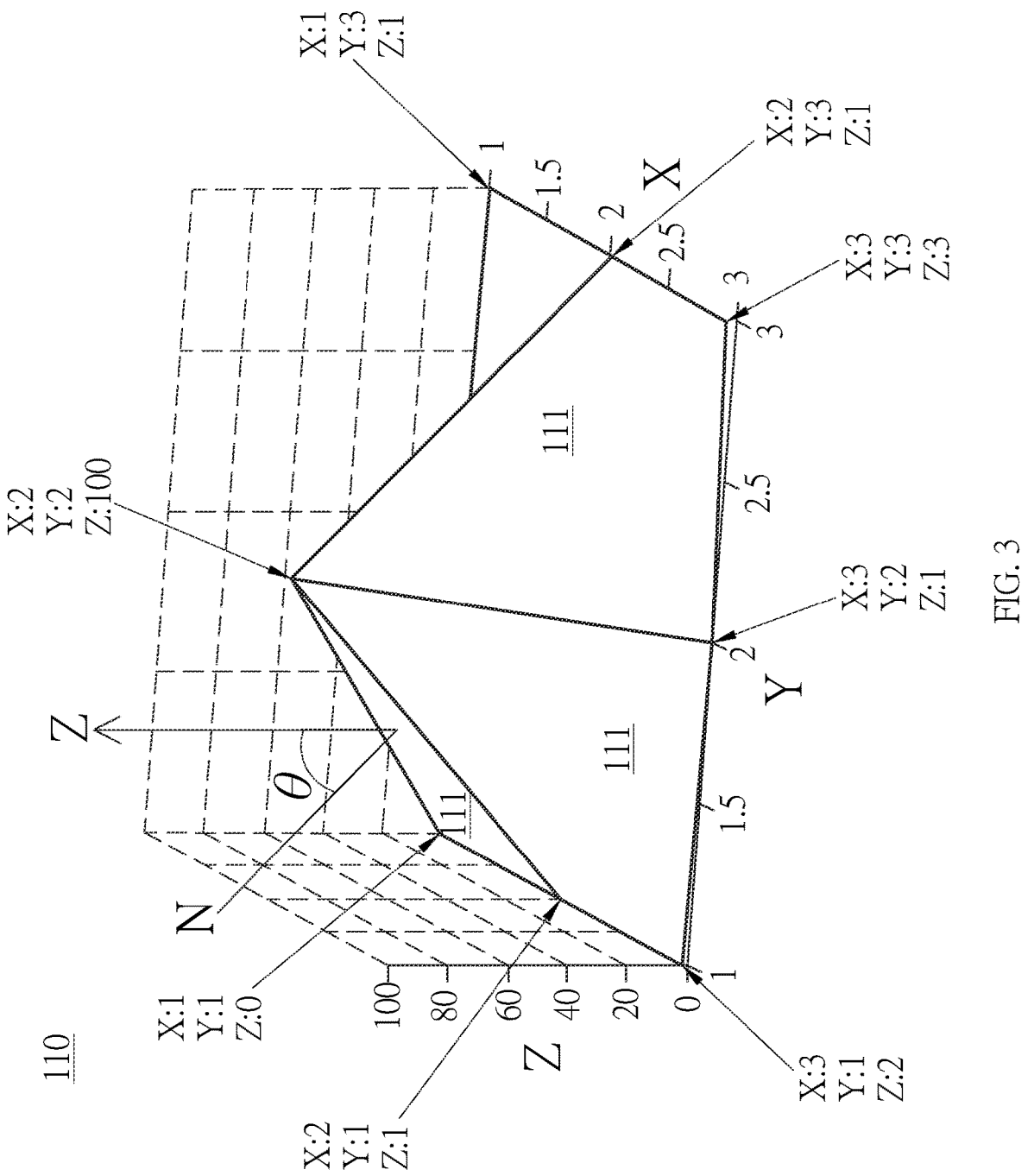
FIG. 3 is a schematic diagram of an embodiment of a protrusion structure of an anti-glare substrate of the present invention.

FIG. 3 is a schematic diagram of an embodiment of a protrusion structure 110. For the convenience of illustrating, X-Y-Z cartesian coordinates are schematically drawn in FIG. 3, wherein X-axis, Y-axis, and Z-axis are orthogonal. As shown in the embodiment in FIG. 3, each protrusion structure 110 includes a plurality of inclined planes 111. There is an angle θ between the normal direction N of the inclined plane 111 and the normal direction Z of the second surface 200 (see FIG. 1). Moreover, the shapes of each protrusion structure 110 could be different, wherein the inclination level of the inclined plane 111 of each protrusion structure 110 could also be different, but the present invention is not limited to this.

Substrates A to O, having the first surface 100 with different protrusion structures 110 were used in a visual anti-glare capability test. Those with great, good, and poor anti-glare capability were respectively labeled "○", "Δ", and "X". In addition, the vertical projection of an object on the second surface 200 is defined as the projection of the object on the second surface 200 when parallel lights, lights whose transmitting direction is perpendicular to the second surface 200 (i.e., the transmitting direction of the parallel lights is along the Z-axis), are used to irradiate the whole object. The vertical projection area of the inclined planes with θ less than 2.5° on the second surface is $A_{<2.5}$, wherein the sum of the vertical projection area of the protruding structures is $A_T$. The test results are listed in Table 1.

More particularly, a 3D microscope is used to measure the surface with 92.7 μm horizontal (parallel with the second surface) resolution and 0.1 μm height resolution. The analyzed area varies with the protrusion scales. In one embodiment, the analyzed range is above 200 μm*300 μm, wherein the result measured is a height array of horizontal isometry grids. Taking the height array of horizontal isometry grids as the coordinate, wherein adjacent three coordinates form a plane, the angle θ between the normal direction N of the inclined plane and the normal direction Z of the horizontal plane can be calculated. Every adjacent three data have the same projection area on the second surface, hence the number of data points in the statistics interval of angle θ divided by the total number of data points measured is the area ratio. For example, if the total number of data points measured is 10000, taking 0-2.5° as the first interval, wherein the data points with angle θ between 0-2.5° are 350, the area ratio for the interval between 0-2.5° is defined as 3.5%. In addition, heights such as the Z-axis as shown in FIG. 3 could be used as statistical data. For example, with the minimum value of measured height defined as 0 and the total number of data points measured being 10000 if 0-1 μm is used as an interval, wherein the number of data points between 0-1 μm are 500, the area ratio for the interval between 0-1 μm is defined as 5%.

TABLE 1

| substrate | anti-glare capability | $\dfrac{A_{<2.5}}{A_T} \times 100\%$ (%) |
|---|---|---|
| A | ◯ | 1.70 |
| B | ◯ | 2.01 |
| C | ◯ | 2.68 |
| D | ◯ | 2.35 |
| E | X | 4.20 |
| F | ◯ | 2.74 |
| G | ◯ | 2.48 |
| H | ◯ | 2.22 |
| I | ◯ | 2.48 |
| J | ◯ | 1.92 |
| K | ◯ | 1.96 |
| L | ◯ | 3.52 |
| M | ◯ | 3.16 |
| N | Δ | 3.58 |
| O | ◯ | 1.85 |

In Table 1, substrate E is taken as the control group, wherein the rest are the anti-glare substrates of the present invention, i.e., the area ratio with θ less than 2.5° is less than 3.58%. According to Table 1, anti-glare substrates of the present invention have good to great anti-glare capability.

In one embodiment, the anti-glare substrate of the present invention further has better anti-stain capability, i.e., stains on the surface of the anti-glare substrate can be cleaned and removed more easily. Where the total reflectance of the anti-glare substrate is less than or equal to 2.5%, particularly less than or equal to 1.5%, and more particularly less than or equal to 1%, stains such as fingerprints on the surface of the anti-glare substrate are more obvious. It may bring advantages such as increasing the consumer's willingness to purchase and degree of satisfaction if stains can be cleaned and removed more easily.

Figure 4:
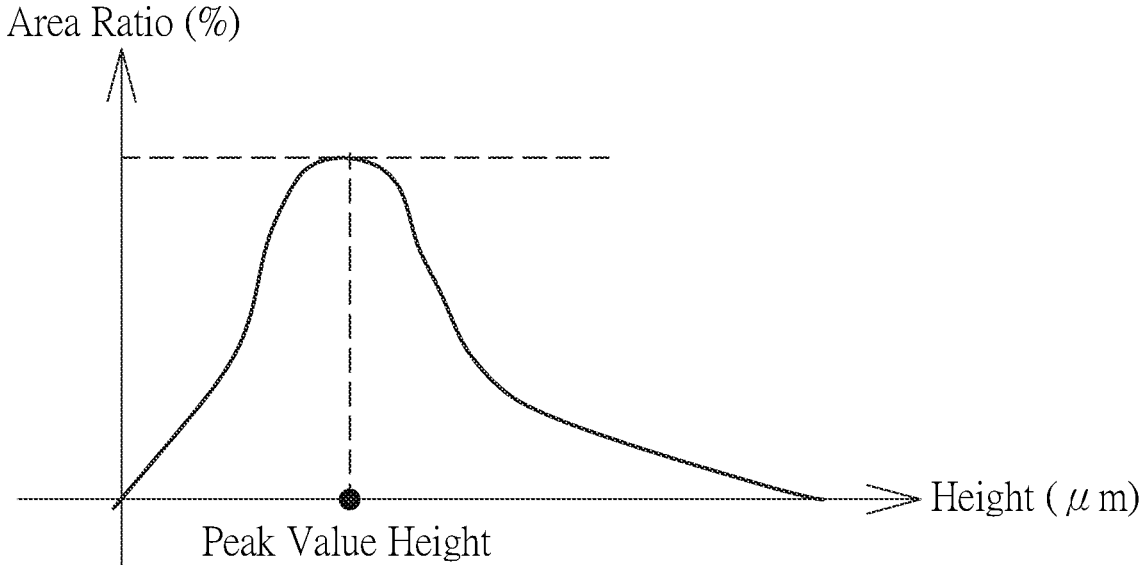
FIG. 4 is a statistics diagram of height data on the first surface of an anti-glare substrate of the present invention.

Substrates A to D and F to O were used in a visual anti-stain capability test, wherein the substrates are wiped by a fibrous cloth in every direction with general force. Those having great anti-stain capability, wherein stains can be removed by less than or equal to three wipes, is labeled "◯". Those having good anti-stain capability, wherein stains can be removed by less than or equal to five wipes, is labeled "Δ". Those having poor anti-stain capability, wherein stains can't be removed by more than five wipes, is labeled "X". The sum of the vertical projection area of the inclined planes with θ less than 35° on the second surface is $A_{\leq 35}$, wherein the vertical projection area of the protrusion structure is $A_T$. On the other hand, as shown in FIG. 3, the minimum value of measured height Z is defined as 0. The distance between each measured height Z data and the Z=0 plane is the structure height. Since the horizontal distances between the measured height data are isometric, the number of data points in a height interval divided by the total number of data points measured is the projection area ratio of this height on the second surface. FIG. 4 is a statistical diagram of the number of data points in a certain height interval divided by the total number of data points measured. The protrusion structure height corresponding to the area ratio with most distribution is defined as the "peak height". The data farthest from the Z=0 plane is the "total height". The sum of the height data divided by the total number of data points measured is defined as the "average height". The test results are listed in Table 2.

TABLE 2

| substrate | anti-stain capability | $\dfrac{A_{\leq 35}}{A_T} \times 100\%$ (%) | total height | peak height/ average height |
|---|---|---|---|---|
| A | Δ | 86.00 | 3 | 0.92 |
| B | ◯ | 95.78 | 3 | 1.08 |
| C | ◯ | 95.75 | 10.75 | 0.53 |
| D | ◯ | 94.58 | 10.75 | 1.39 |
| F | ◯ | 91.16 | 6 | 0.97 |
| G | X | 91.09 | 3.25 | 0.99 |
| H | X | 84.18 | 3.75 | 0.97 |
| I | X | 80.96 | 6.25 | 1.02 |
| J | X | 85.93 | 4.5 | 0.96 |
| K | X | 85.89 | 3. | 1.03 |
| L | Δ | 91.47 | 4.25 | 1.00 |
| M | Δ | 91.22 | 7. | 1.02 |
| N | ◯ | 99.44 | 3.75 | 1.14 |
| O | ◯ | 94.87 | 4.5 | 1.11 |

In accordance with Table 2, the anti-glare substrate of the present invention with $$\frac{A_{\leq 35}}{A_T} \times 100\% \geqq 86\%$$

and the ratio of peak height to average height less than or equal to 0.92 has good anti-stain capability. The anti-glare substrate of the present invention with $$\frac{A_{\leq 35}}{A_T} \times 100\% \geqq 91.16\%$$

and the ratio of peak height to average height less than or equal to 0.97 has great anti-stain capability. The anti-glare substrate of the present invention with $$\frac{A_{\leq 35}}{A_T} \times 100\% \geqq 94.58\%$$

and the ratio of peak height to average height less than or equal to 1.39 has greater anti-stain capability.

For a conventional anti-reflection film, the reflectances in the normal direction of a mirror substrate to blue ray (e.g., a light having the wavelength between 400-500 nm), green ray (e.g., a light having the wavelength between 500-600 nm), and red ray (e.g., a light having the wavelength between 600-700 nm) respectively are roughly the same. However, the reflectance of the conventional anti-reflection film in the normal direction of the anti-glare substrate of the present invention to blue ray is less than or equal to its reflectance to green ray, which is in turn less than or equal to its reflectance to red ray, i.e., color shift can be observed obviously by eyes in the normal direction of the second surface. More particularly, the color shifts to red. An anti-reflection film suitable for the anti-glare substrate of the present invention should have similar reflectances to blue, green, and red lights on the basis of good anti-glare capability. A suitable anti-reflection film, e.g., one that uses a multi-layer anti-reflection technique, when applied on a common mirror surface, would have a thickness with the characteristics of having a reflectance to blue ray greater than or equal to its reflectance to green ray, which is in turn greater than or equal to its reflectance to red ray, which makes color compensation in advance and balances the colors to achieve lower total reflectance. In other words, for a first assembly formed by disposing the anti-reflection film on the anti-glare substrate, the reflectance to blue ray, the reflectance to green ray, and the reflectance to red ray are close. For a second assembly formed by disposing the anti-reflection film on a mirror substrate, the reflectance to blue ray is greater than or equal to the reflectance to green ray, which is in turn greater than or equal to the reflectance to red ray.

The present invention is described by means of the above-described relevant embodiments. However, the above-described embodiments are only examples for implementing the present invention. It should be pointed out that the disclosed embodiments do not limit the scope of the present invention. In contrast, the spirit included in the scope of the patent application and modifications and equivalent settings made within the scope are all included in the scope of the present invention.

What is claimed is:

1. An anti-glare substrate comprising a first surface and a second surface disposed on opposite sides of the anti-glare substrate, wherein the first surface includes a plurality of protrusion structures, wherein each protrusion structure includes a plurality of inclined planes, wherein there is an angle $\theta$ between a normal direction of each inclined plane and the normal direction of the second surface, wherein a sum of a vertical projection area of the inclined planes with $\theta$ less than 2.5° on the second surface is $A_{<2.5}$, wherein the vertical projection area of the inclined planes is $A_T$, wherein $$\frac{A_{<2.5}}{A_T} \times 100\% \leq 3.58\%,$$

wherein a total reflectance of the anti-glare substrate is less than or equal to 2.5%, wherein the sum of the vertical projection area of the inclined planes with $\theta$ less than or equal to 35° on the second surface is $A_{\leq 35}$, wherein $$\frac{A_{\leq 35}}{A_T} \times 100\% \geq 94.58\%;$$

wherein among statistics of height data of isometric grids measured in a measuring area on the first surface, an interval with a most amount is defined as a peak height, wherein a ratio of the peak height to an average value of the height data is less than or equal to 1.39.

2. The anti-glare substrate according to claim 1, wherein the first surface is formed by the plurality of protrusion structures connected with each other.

3. The anti-glare substrate according to claim 1, wherein the total reflectance of the anti-glare substrate is less than or equal to 1.5%.

4. The anti-glare substrate according to claim 1, wherein the total reflectance of the anti-glare substrate is less than or equal to 1%.

5. A display device, comprising:
a display panel having a display face;
the anti-glare substrate according to claim 1, wherein the second surface is laminated on the display face.

6. The display device according to claim 5, further comprising an anti-reflection film disposed on the anti-glare substrate, wherein a reflectance to blue ray, a reflectance to green ray, and a reflectance to red ray are close.

7. An anti-glare substrate comprising a first surface and a second surface disposed on opposite sides of the anti-glare substrate, wherein the first surface includes a plurality of protrusion structures, wherein each protrusion structure includes a plurality of inclined planes, wherein there is an angle $\theta$ between a normal direction of each inclined plane and the normal direction of the second surface, wherein a sum of a vertical projection area of the inclined planes with $\theta$ less than 2.5° on the second surface is $A_{<2.5}$, wherein the vertical projection area of the inclined planes is $A_T$, wherein $$\frac{A_{<2.5}}{A_T} \times 100\% \leq 3.58\%,$$

wherein a total reflectance of the anti-glare substrate is less than or equal to 2.5%, wherein the sum of the vertical projection area of the inclined planes with $\theta$ less than or equal to 35° on the second surface is $A_{\leq 35}$, wherein $$\frac{A_{\leq 35}}{A_T} \times 100\% \geq 91.16\%;$$

wherein among statistics of height data of isometric grids measured in a measuring area on the first surface, an interval with a most amount is defined as a peak height, wherein a ratio of the peak height to an average value of the height data is less than or equal to 0.97.

8. The anti-glare substrate according to claim 7, wherein the first surface is formed by the plurality of protrusion structures connected with each other.

9. The anti-glare substrate according to claim 7, wherein the total reflectance of the anti-glare substrate is less than or equal to 1.5%.

10. The anti-glare substrate according to claim 7, wherein the total reflectance of the anti-glare substrate is less than or equal to 1%.

11. An anti-glare substrate comprising a first surface and a second surface disposed on opposite sides of the anti-glare substrate, wherein the first surface includes a plurality of protrusion structures, wherein each protrusion structure includes a plurality of inclined planes, wherein there is an angle $\theta$ between a normal direction of each inclined plane and the normal direction of the second surface, wherein a sum of a vertical projection area of the inclined planes with $\theta$ less than 2.5° on the second surface is $A_{<2.5}$, wherein the vertical projection area of the inclined planes is $A_T$, wherein $$\frac{A_{<2.5}}{A_T} \times 100\% \leq 3.58\%,$$

wherein a total reflectance of the anti-glare substrate is wherein less than or equal to 2.5%, wherein the sum of the vertical projection area of the inclined planes with $\theta$ less than or equal to 35° on the second surface is $A_{\leq 35}$, wherein $$\frac{A_{\leq 35}}{A_T} \times 100\% \geq 86\%;$$

wherein among statistics of height data of isometric grids measured in a measuring area on the first surface, an interval with a most amount is defined as a peak height, wherein a ratio of the peak height to an average value of the height data is less than or equal to 0.92.

12. An anti-glare substrate comprising a first surface and a second surface disposed on opposite sides of the anti-glare substrate, wherein the first surface includes a plurality of protrusion structures, wherein each protrusion structure includes a plurality of inclined planes, wherein there is an angle $\theta$ between a normal direction of each inclined plane and the normal direction of the second surface, wherein a sum of a vertical projection area of the inclined planes with $\theta$ less than 2.5° on the second surface is $A_{<2.5}$, wherein the vertical projection area of the inclined planes is $A_T$, wherein $$\frac{A_{<2.5}}{A_T} \times 100\% \leq 3.58\%,$$

wherein a total reflectance of the anti-glare substrate is less than or equal to 2.5%, wherein the sum of the vertical projection area of the inclined planes with $\theta$ less than or equal to 35° on the second surface is $A_{\leq 35}$, wherein $$\frac{A_{\leq 35}}{A_T} \times 100\% \geq 86\%.$$

13. An anti-glare substrate comprising a first surface and a second surface disposed on opposite sides of the anti-glare substrate, wherein the first surface includes a plurality of protrusion structures, wherein each protrusion structure includes a plurality of inclined planes, wherein there is an angle $\theta$ between a normal direction of each inclined plane and the normal direction of the second surface, wherein a sum of a vertical projection area of the inclined planes with $\theta$ less than 2.5° on the second surface is $A_{<2.5}$, wherein the vertical projection area of the inclined planes is $A_T$, wherein $$\frac{A_{<2.5}}{A_T} \times 100\% \leq 3.58\%,$$

wherein a total reflectance of the anti-glare substrate is less than or equal to 2.5%, wherein among statistics of height data of isometric grids measured in a measuring area on the first surface, an interval with a most amount is defined as a peak height, wherein a ratio of the peak height to an average value of the height data is less than or equal to 1.39.

* * * * *